Figures 6, 7:
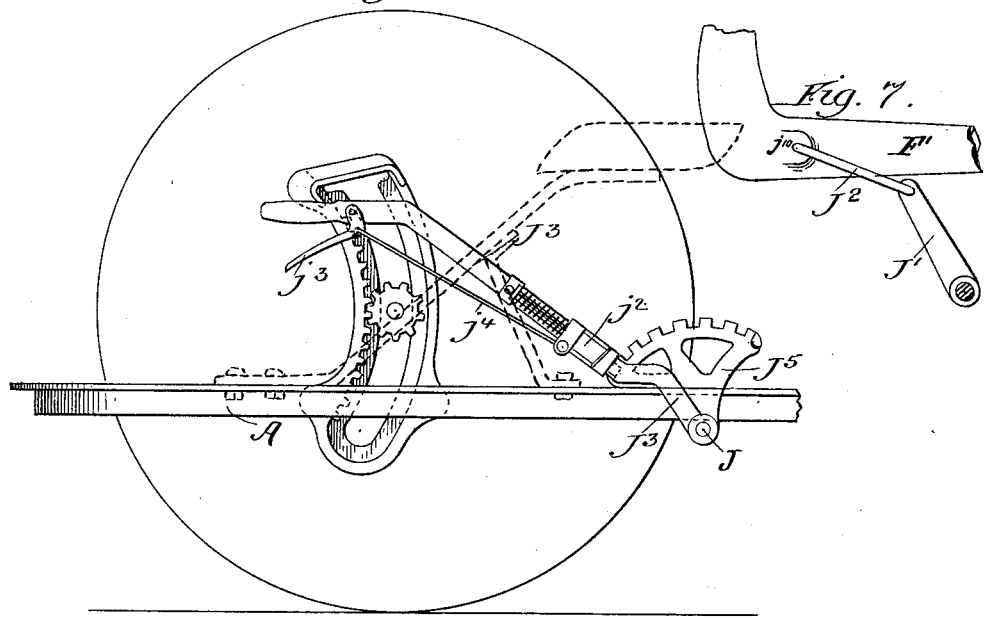

(No Model.)  5 Sheets—Sheet 1.
A. STARK.
GRAIN HARVESTER.
No. 360,061.  Patented Mar. 29, 1887.
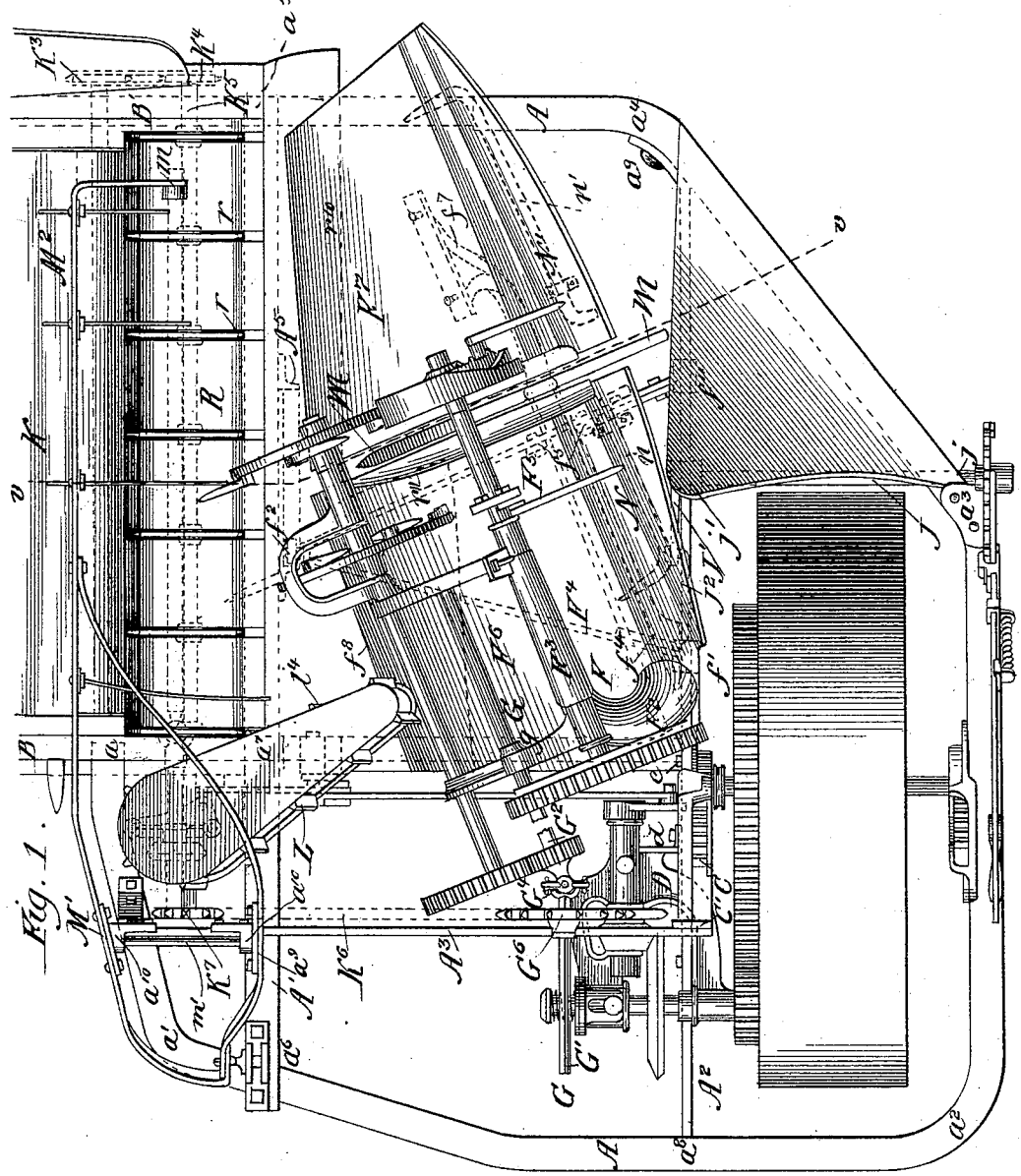
Witnesses:
Frank J. Blanchard
Francis W. Parker
Inventor:
Andrew Stark
By Chas. S. Burton
Attorney.

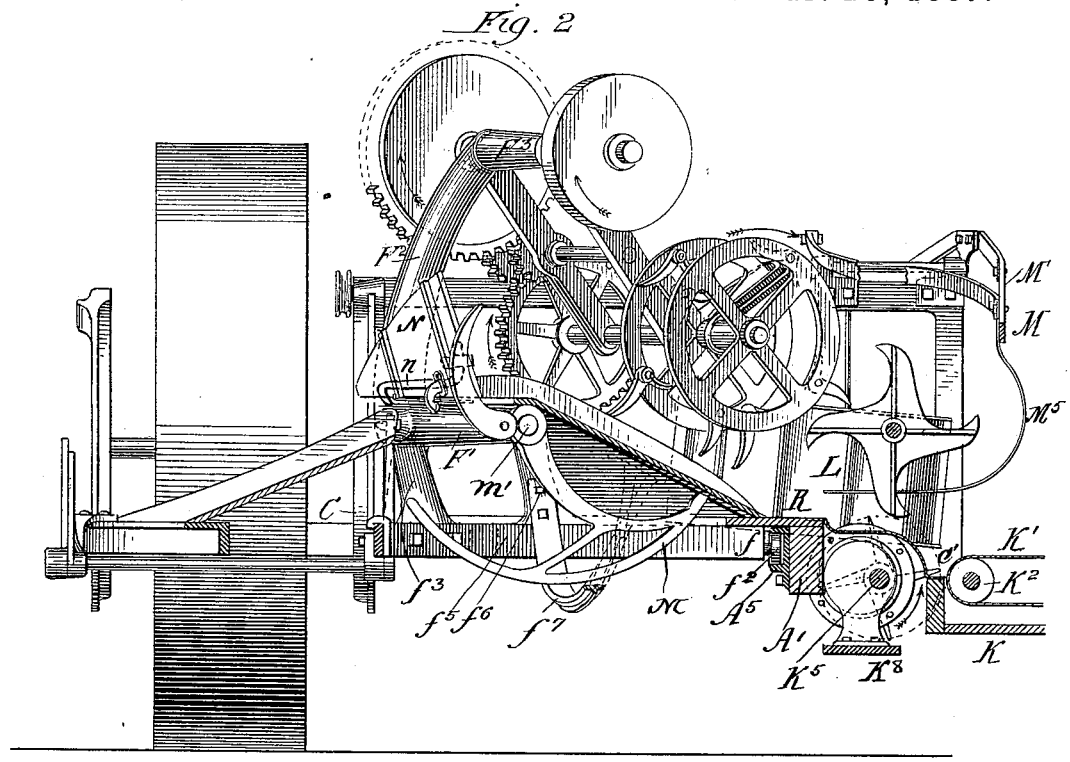
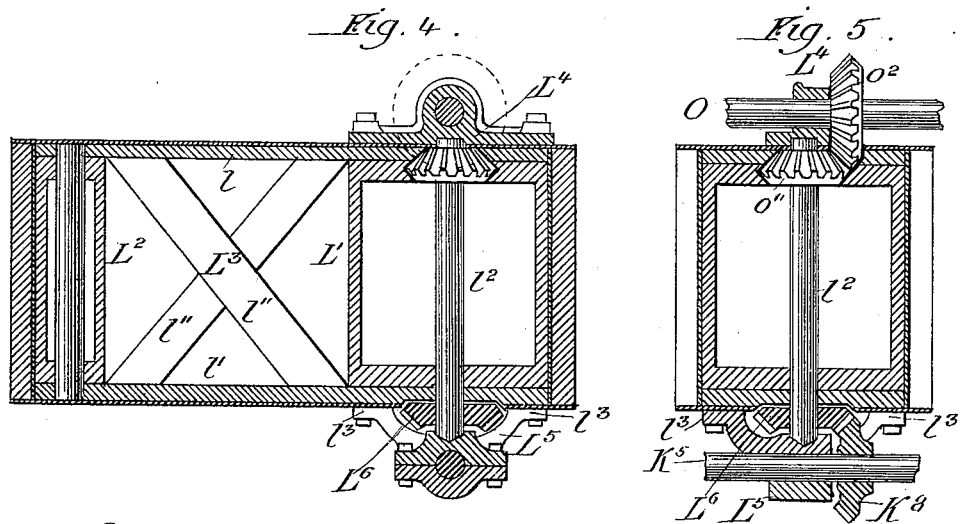

(No Model.) 5 Sheets—Sheet 3.
A. STARK.
GRAIN HARVESTER.
No. 360,061. Patented Mar. 29, 1887.
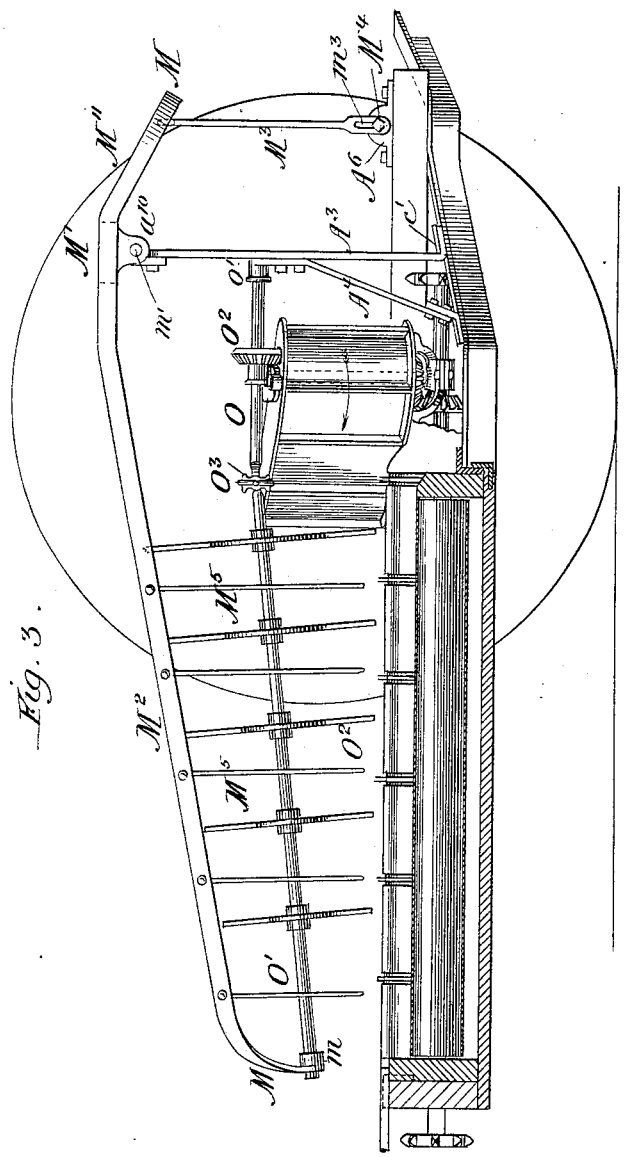

(No Model.)  5 Sheets—Sheet 4.

A. STARK.
GRAIN HARVESTER.

No. 360,061.  Patented Mar. 29, 1887.

Witnesses:
Frank J. Blanchard
Francis W. Parker

Inventor:
Andrew Stark
By Chas. S. Burton
Attorney (No Model.)  5 Sheets—Sheet 5.
A. STARK.
GRAIN HARVESTER.

No. 360,061. Patented Mar. 29, 1887.

Witnesses:
Saml. B. Dover.
Francis W. Parke

Inventor:
Andrew Stark
by Chas. S. Burton
Atty.

UNITED STATES PATENT OFFICE.

ANDREW STARK, OF CHICAGO, ILLINOIS.

GRAIN-HARVESTER.

SPECIFICATION forming part of Letters Patent No. 360,061, dated March 29, 1887.

Application filed October 27, 1884. Serial No. 146,549. (No model.)

*To all whom it may concern:*

Be it known that I, ANDREW STARK, a citizen of the United States, and residing at Chicago, in the county of Cook and State of Illinois, have invented certain new and useful Improvements in Grain-Harvesters, which are fully set forth in the following specification.

The purposes of this invention are, first, to provide a self-binding harvester which employs an endless-belt platform to remove the cut grain from behind the sickle, with mechanism for clearing the grain from such platform onto the receiving-platform in such manner as to prevent the grain from being carried down at the end of the canvas and "choking" the platform-conveyer; second, to so deliver the grain onto the receiving-platform that the packers, whose direction of motion is oblique to that of the platform-conveyer, may take the grain from the receiving-platform and deliver it to the binder with its length at right angles to the direction of their own motion; third, to locate a binder inside the drive-wheel in an oblique position, so as to deliver the bundle obliquely behind and in the track of the drive-wheel, and to do so without increasing the distance between the platform and the wheel, and without unduly contracting the space for the accumulation of grain in the intervals of binding, and for turning it into the necessary oblique position in which it is to be bound; fourth, to provide positive means for delivering the grain from the cutter-bar platform, and for moving it into position where it may be subjected to the action of devices acting upon the butts to assist in deflecting it; fifth, to provide a guard for the standing grain to prevent it from falling into the gearing, and which shall also act as an assistance to the inside divider in high grain; sixth, to provide a device to retain the grain upon the receiving-platform within reach of the action of the various devices by which it is designed to be advanced and deflected, which may rise and fall, floating upon the grain, and so not exert so great pressure upon it as to impede the delivery of it from the conveying-platform by the devices provided for that purpose; seventh, to so arrange, in connection with means for discharging the bundle, a yielding resisting-piece against which the pressure communicated by the packers and dischargers may be exerted, that it may in yielding influence the direction of discharge of the bundle to make it clear the wheel.

Figure 8:
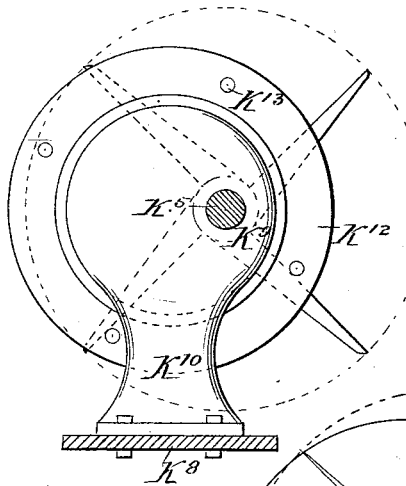
Figure 9:
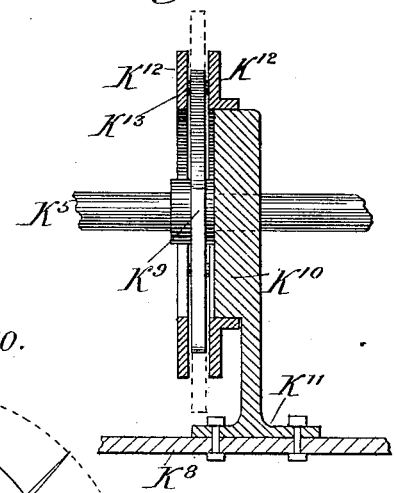
Figure 10:
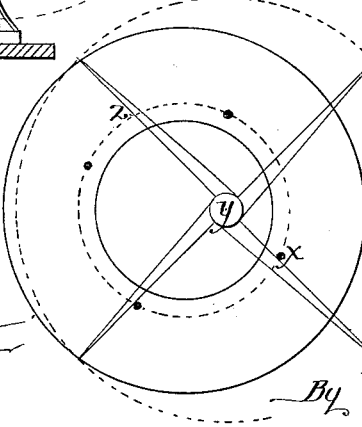
Figure 11:
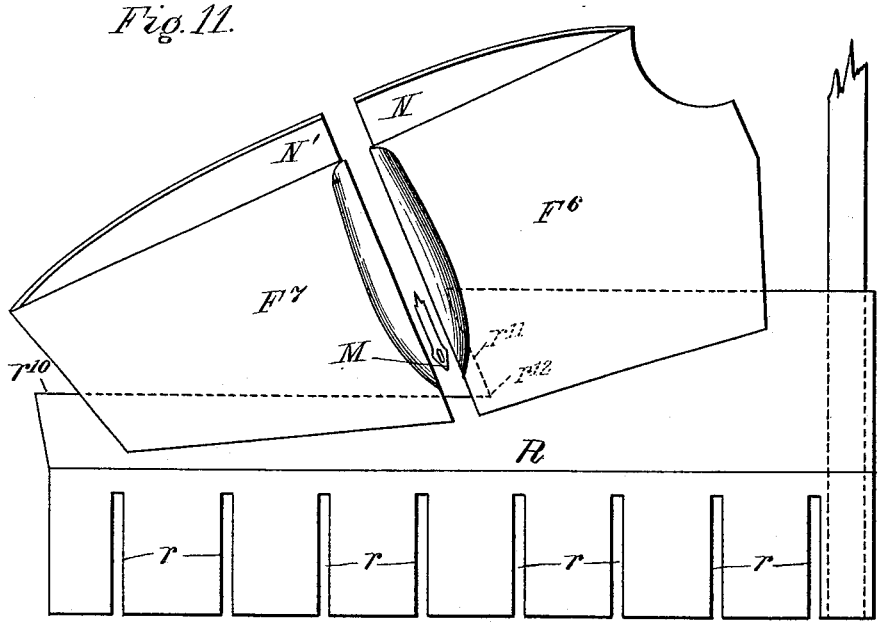
Figure 12:
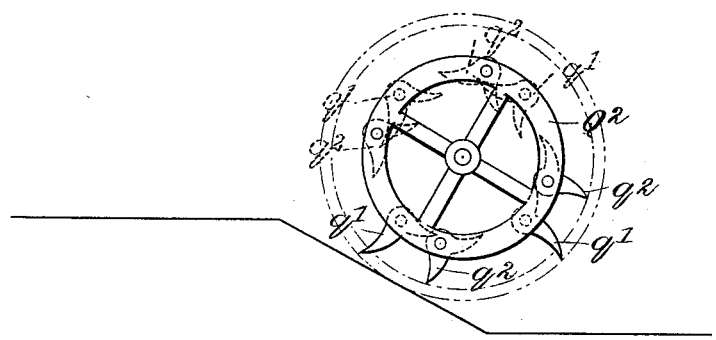

Figure 1 is a plan of a harvester and binder containing my improvements, the platform being cut away, the reel being omitted, and the upper clearing-rake being omitted, except that its shaft is shown in dotted line. Fig. 2 is a rear sectional elevation of the same, section being made along the line $v\ v$, Fig. 1. Fig. 3 is an inside elevation of my grain-rake and butting device. Fig. 4 is a longitudinal and Fig. 5 a transverse vertical section of the butting device, showing its driving-gearing. Fig. 6 is an outside elevation of the main frame, showing the seat in dotted lines and the lever for shifting the binder. Fig. 7 is a detail showing the crank-and-link connection by which the movement of the binder-shifting rock-shaft is communicated to the binder-frame. Fig. 8 is a side elevation, and Fig. 9 a vertical transverse section, of my under clearing-rake and its stripping device. Fig. 10 is a diagram illustrating the principle of construction of same device shown in Figs. 8 and 9. Fig. 11 is a plan of the grain receiving and binding platforms, all operating mechanism being removed. Fig. 12 is a rear elevation of the packers, showing the relative length and position of their teeth, respectively.

A is the main frame, of angle-iron, secured to the finger-bar B at $a$, extending thence forward to $a'$, and constituting the inside divider, thence stubbleward in front of the drive-wheel to $a^2$, and rearward outside the wheel to $a^3$, thence diagonally rearward and grainward to $a^4$, where it is bolted to the stubble end of the rear sill, B', of the conveying-platform.

A' is a cross-beam joined to the rear sill at $a^5$ and to the main frame at $a^6$, passing above the finger-bar at $a^7$.

$A^2$ is a cross-beam, of three-eighths-inch iron plate, bolted to the main frame at $a^8$ and $a^9$. The segment C is secured to it at $c$, and the gear-frame D is secured to it at $d$.

$A^3$ is a three-eighths-inch iron beam set edgewise, secured to the ear C', extended from the upper end of the inner segment, and extended thence across grainward to a point above the part of the main frame which forms the inside divider, and thence bends downward and forms its own support, and is secured to the main frame at $c'$, being also provided with the brace $A^4$, rendering rigid its connection with the main frame.

F is the binder-frame, composed of the lower horizontal arm, $F'$, the upright standard $F^2$, and the upper horizontal arm, $F^3$. The entire frame stands in a position oblique to the wheel and conveying-platform. Its mechanism is not shown nor designed to be claimed in this application, except as follows:

G is a shaft supported at its front end on the main frame and deriving motion in any convenient manner, and having the universal joint $G^4$, connecting its front section, $G'$, to its rear section, $G^2$, and having its said rear section journaled obliquely to its front section in the oblique binder-frame, and by suitable mechanism (not shown) communicating motion to the working parts of the binder, including the binder-arm or needle W, which is fixed to the rock-shaft $W'$, journaled in the lower arm, $F'$, of the binder-frame, and describes an arc in a plane at right angles to this lower arm and hence oblique to the direction of the conveying mechanism of the cutter-bar platform.

The entire binder-frame is sustained upon the main frame by means of the V-shaped frame composed of the bars $F^4$ and $F^5$, joined at $f$. The ends $f'$ and $f''$ of said bars $F^4$ and $F^5$ are formed into hooks, which clasp the beam $A^2$ and slide upon it. The joined ends at the angle $f$ rest upon the ledge $A^5$, formed on the side of the cross-bar $A'$, and said angle is preferably furnished with the roller $f^2$, to travel with the less friction on said ledge. The binder-frame arm $F'$ is secured to the bars $F^4$ and $F^5$ at $f^4$ and $f^5$, respectively, being provided with the ears $f^3$ and $f^6$, whereby a sufficiently firm and rigid connection is obtained to sustain it without other support.

J is a shaft having one bearing on the main frame at $j$ and another on the cross-bar $A'$ at $j'$. Inside the latter bearing it has the crank-arm $J'$, from which extends the link $J^2$, which is coupled to the lug $j^{10}$ on the lower arm, $F'$, of the binder-frame. At its outer end the shaft J is provided with the lever $J^3$, extended up to within reach of the driver passing alongside of the locking-segment $J^5$, fixed on the main frame, and furnished with suitable catch-bolt, $j^2$, and lever $j^3$ and link $j^4$, to operate the same in the familiar manner illustrated. By swinging the lever $J^3$ and rocking the shaft J the crank $J'$, through the link $J^2$, connecting it with the binder-frame, as described, will move the binder back or forward in its slide-bearings. The ledge $A^5$ and the bar $A^2$ of the main frame A and the catch-bolt $j^2$, engaging in the notches of the segment $J^5$, will retain the binder firmly in any position to which it may be so moved.

K is the conveying or cutter-bar platform. In this case it consists of an endless belt, $K'$, carried around the roller $K^2$, journaled in the front and rear sills, and driven by a chain over the sprocket-wheel $K^3$ on its rear end, said chain being driven by a sprocket-wheel, $K^4$, on the rear end of the shaft $K^5$, which is also journaled on the front and rear sills, and is driven by a chain, $K^6$, over the sprocket-wheel $K^7$, fixed on its front end, said chain deriving motion from the main driving-train.

R is the receiving-platform, which is secured on the cross-beam $A'$, and has the depressed and slotted portion overlying the shaft $K^5$, and through the slots $r$ in said portion of the receiving-platform the teeth carried by the shaft $K^5$, and which with said shaft constitute a revolving rake, revolve upward and stubbleward, protruding into the depression or trough formed at the end of the conveying-platform by the depressed portion of the receiving-platform.

The receiving-platform extends stubbleward from the cross-beam substantially horizontally, resting upon and being supported by the base-frame bars $F^4$ and $F^5$ of the binder-frame. It extends forward to the line of the finger-bar, and may be supported along its front edge by blocks or brackets secured to or resting upon the finger-bar. It is cut away at the rear outer part between the two lines $r^{10}$ and $r^{11}$, which intersect at a point, $r^{12}$, a little forward and inward from the most forward and innermost position of the point of the needle, one of said lines, $r^{10}$, being parallel with the slide-bearings of the binder, and the other being parallel with the plane of oscillation of the needle, thus leaving free space for the needle to oscillate in all positions of the binder, and becoming of the shape shown in the drawings.

The front section of the binder-platform or table $F^6$—that portion in front of the needle-rift—is secured to the horizontal arm $F'$ of the binder-frame F, a narrow horizontal portion of said platform overlying said arm, and thence slopes downward grainward and rests its lower edge upon the receiving-platform. Since the binder-frame stands obliquely to the cutter-bar and conveying-platform, the binding-table $F^6$, sloping downward, will meet the horizontal receiving-platform in a line oblique to the end of the canvas, farther from it at front than at rear. The rear section, $F^7$, of the binder-table is supported by suitable bracket, $f^7$, secured to the arm $F^5$ of the base-frame, and stands with its front edge forming the rear boundary of the needle-rift on level with the rear edge of the front section, $F^6$, along the entire edge from the top of the slope down to the receiving-platform; but in order that it may meet the receiving-platform in a line substantially parallel with the end of the canvas and with the shaft $K^5$ of the clearing-rake, it is made to slope down backward from the needle-rift, as illustrated.

The binding-table overlaps the receiving table or platform sufficiently so that when the binder is farthest back the oblique edge $f^8$ will not stand back of and so not uncover the angle $r^{12}$ in the receiving-platform, which is the point at which the needle comes up when the needle is farthest forward.

To the outside edge of the binder-table, at a line at right angles with the path of the needle beyond the arm F' of the binder-frame, I hinge to the front and rear sections of said table, respectively, the two triangular flaps or leaves, N and N', and provide them with torsion-springs $n$ $n'$, connected in a familiar manner, adapted to sustain said leaves upright above the binder-table in front of the bundle accumulated and bound thereon, and offering resistance to the pressure of the packers and dischargers on the opposite side of the bundle, said springs being adapted to yield to moderate pressure, and permit said resisting-pieces to be forced down, and permit the discharge of the bundle over them and immediately return to their upright position. The triangular shape of the resistance-pieces N and N', having the bases of the triangles on either side of the needle-rift at the middle of the bundle, permits the bundle to overhang them at their narrower portion, the heads and the butts of the bundle being always more expanded than the middle, which is under the retaining pressure of the band, thus being given the space which they require, and permitting the resisting-pieces to press in against the bundle on either side of the band, and thereby being directly opposed to the action of the dischargers, securing a more direct discharge of the bundle. By providing the forward resisting-piece, N, with a stiffer spring than the rear piece, N', has it is adapted to the greater solidity of the butts as compared with the heads, and I find that the effect of this greater solidity and correspondingly greater resistance is that when the resisting-pieces yield to the pressure of the head and butts of the bundle behind them, respectively, the bundle is discharged with a somewhat greater impetus at the butts than at the heads on account of the expansion of the bundle, which has been more compressed against the resisting-piece at the butts—because that piece offered greater resistance—so that in expanding its reaction against the discharger is greater at the butts, whereby the bundle is turned obliquely to the rear in discharging and avoids the wheel, so enabling me to locate the entire binder somewhat farther forward and nearer to the wheel than I otherwise could.

L is a butting-belt. It is driven by the roller L', and carried round the roller $L^2$, both which rollers are journaled in bearings on the frame $L^3$, composed of the upper head, $l$, and the lower head, $l'$, and the connecting braces or standard $l''$. This entire frame is bolted fast to the platform R, being slightly raised at the end toward the binder and extended over the binder-platform a short distance, but not attached thereto. The upper bearing of the shaft $l^2$ of the driving-roller L' is in the casting $L^4$, which is secured to the upper head, $l$, and has also a bearing for a horizontal shaft, O, the purpose of which is hereinafter explained. The lower bearing of the shaft $l^2$ is in the yoke $L^5$, which is formed with the ears or flanges $l^5$, by which it is attached to the lower head, $l'$, of the butting-belt frame $L^3$, and has beside the bearing for the vertical shaft $l^2$ a bearing for the horizontal shaft $K^5$, which passes through it, and by means of the bevel-gears $K^8$ thereon, meshing with the bevel-gear $L^6$ on the shaft $l^2$, drives the butting-belt L. The two shafts $K^5$ and $l^2$, having their bearings in the same casting, (the yoke $L^5$,) are kept securely in mesh thereby. The shaft $l^2$ is stepped in its bearing in the yoke and supported by it. The yoke is supported both by being secured to the lower head, $l'$, of the butting-belt frame and by the horizontal shaft $K^5$, which passes through it, and has two other independent bearings in the front and rear sills. The butting-belt is provided with vertical ribs $l^4$, to enable it to engage the grain.

For the butting-belt herein shown there may be substituted the vertical vibrating and reciprocating butt-board shown and described in my application filed August 4, 1883, Serial No. 102,763, or any similarly-acting device whose grain-actuating face should move in a vertical plane oblique to the motion of the platform-conveyer.

M is a device which I call a "grain-retainer." It serves also the purpose of an upper inside divider and grain-guard to keep the standing grain from the gearing, and prevent it when cut from falling into the gearing instead of upon the platform. It consists of the upper guard or frame, M', which is a lever having its fulcrum upon any rigid part of the frame well forward. As shown, it is provided with the rock-shaft $m'$, pivoted to the ears $a^{10}$ and $a^{10}$ upon the upper frame-bar, $A^3$. The longer arm, $M^2$, of this lever extends rearward from its fulcrum above, or slightly grainward from the line of that portion of the main frame which constitutes the inside divider and directly back across the entire width of the platform, being bent stubbleward and downward at the rear end, and at that end provided with the bearing $m$ for the shaft O'. At the front end the short arm $m''$ of the lever, which is only a few inches long, is connected to the link $M^3$, which hangs down over the main frame, and has the slot $m^3$, through which protrudes the stud $M^4$, rooted in the main-frame bar or a suitable adjunct, as the piece $A^6$. The length of the link $M^3$ to the end of the slot $m^3$ and the position of the stud $M^4$ and the length of the slot $m^3$ are such as to permit the guard M to assume the position hereinafter described, and to have a vertical oscillation of such amount as is necessary to the functions hereinafter stated as pertaining to it. To the portion of the long arm of the lever which overhangs the cutter-bar platform I attach the fingers $M^5$, preferably spring-fingers, which curve downward and stubbleward and overhang the receiving-platform, being of such length as to very nearly rest upon the platform R at the lowest position of the lever M', and are designed to float upon the grain which is fed under them by the various forwarding devices hereinbefore and hereinafter described.

The casting $L^4$, which contains the upper journal-bearing of the shaft $l^2$ of the butting-belt driving-roller, contains also the horizontal bearings $o$ for the short shaft O, (which has another bearing, $o'$, on the frame-bar $A^3$,) and to the rear end of which is coupled by a universal joint, $O^3$, the shaft $O'$, which has its rear bearing in the rear end of the lever M, as above stated. Bevel-gears $O^2$ and $O^{11}$ communicate motion from the shaft $l^2$ to the shaft O. The arrow-heads on sundry wheels of the train indicate the direction of rotation of the several wheels, which is such as to advance the grain off the cutter-bar platform onto the receiving-platform, and thence toward the binder.

The shaft $O'$ is provided with two or more disks having the arms or fingers or teeth $O^2$. The length of the teeth should preferably decrease from the front disk to the rear disk, the longer teeth at the front being necessary to give the butts of the grain a longer stroke and assist in turning it into an oblique position parallel with the binder. This device I call the "upper clearing-rake." Although here shown sustained in a floating frame, it may be employed in a fixed frame, and it may be employed as the sole device for turning the grain into the desired oblique position. When the other deflecting devices herein described are employed, this one may in many cases safely be omitted; but in some conditions and kinds of grain I find it to be a preferable useful addition not only to the means for clearing the grain off the conveying-platform, co-operating with the under clearing-rake, but also to the means for turning the grain into an oblique position, co-operating with the butting-belt and the obliquely-placed packers. When employed, its teeth revolve between the retaining-fingers of the floating grain-retainer and it rises and falls, floating on the grain with the frame, in which it has its rear bearing. The forward teeth, being nearer to the fulcrum of the lever, will not vary their position so much as the rear teeth with the rise and fall of the frame, so that the deeper the grain lies over the under clearing-rake and on the receiving end of the receiving-platform the greater will be the excess of the action of the front teeth over that of the rear teeth and the greater the deflecting effect of the device upon the grain, which is as desirable, since when the grain is heavy and accumulating the difficulty of turning it by the butting-belt and oblique packers is greatest.

The action of the butting-belt to hasten the butts and turn the grain into oblique position is fully described in my application filed February 11, 1884, Serial No. 120,423. I find it usually to be sufficient for the purpose without the assistance of any other turning devices except the obliquely-acting packers, and hence usually remove the overhanging clearing-rake, which by its longer front teeth is, when used, a further assistance to the turning of the grain. It is only needed, however, in very extreme cases of heavy grain.

It should be noticed that I extend the butting-belt L past the front end of the clearing-rake, so that the grain carried by the teeth of the latter will have its butts lodged against the advancing face of the canvas, and in such position that it cannot escape being acted upon thereby, and particularly by its ribs, which will positively advance the butts which the positively-acting clearing-teeth have thus put directly in their path.

It should be noticed, further, that the spring-retaining fingers $M^5$ extend past the under clearing-rake, and that the grain lying under and restrained by them is thereby also detained against and subject to the action of the butting-canvas; also, that when these fingers are made longer at the front than at the rear, as illustrated, and as is preferable, that structure alone, without other deflecting devices, tends to keep the grain lying under them and subject to the action of the under clearing-rake for a longer time at the front than at the rear, the grain in front being pushed by the grain behind as long as the action of the retaining-fingers keeps the mass sufficiently compact, so that this structure tends to cause it to assume the desired oblique position.

The binding mechanism, (not shown in detail,) including the packers, is driven by the shaft G, journaled in the binder-frame at $g$, parallel to the oblique arm $F^3$ of said frame. It has the universal joint $G^4$, and at the front end is square and slides through the sprocket-wheel $G^6$, which is journaled on the main frame and derives motion from the chain which drives the platform-conveyer, as hereinbefore described. As the binder is moved forward and backward over the main frame the square portion $G'$ of the shaft G slides through the sprocket-wheel $G^6$, and the universal joint $G^4$ permits the rear end of the shaft G to remain freely in its bearings oblique to the direction of motion of the binder.

I will now describe in detail the structure of the under clearing-rake at the delivery end of the conveying-platform.

To the shaft $K^5$ are rigidly secured, one underneath each slot $r$ in the receiving-platform R, the toothed wheels or disks $K^9$ under the shaft $K^5$. Secured at the front and rear, respectively, to the finger-bar and the rear sill is the board $K^8$, and to its upper surface are secured, one alongside each spur-wheel $K^9$, the circular disks $K^{10}$, eccentrically pierced for the passage of the shaft $K^5$, and having the lugs $K^{11}$, by which they are bolted to the board $K^8$. These eccentric disks $K^{10}$ serve as the bearings for the annular stripping-disks $K^{12}$, which are made in pairs, each pair embracing between them one of the revolving spur-wheels $K^9$. The two annular disks of each pair are secured together by bolts or rivets $K^{13}$, equispaced, and arranged one in each interval between the teeth of the spur-wheels K⁹. Only one of the stripping-disks of each pair need be furnished with an eccentric bearing-piece, K¹⁰, although both may be so provided, and by providing it with suitable flanges to retain it upon the bearing-piece one stripping-disk, K¹², might be made to suffice, although it would not so effectually perform the purpose of the device. The axis of the shaft K⁵ is grainward from the line of centers of the annular disks a distance which is half of the distance which it is desired to have the teeth protrude beyond the periphery of the stripping-rings toward the platform-canvas, the outer diameter of the annular stripping-disks being such as to cover the teeth at the point of the greatest distance of its periphery from the axis of the shaft— viz., on the side toward the binder.

The operation of this structure will be best understood by considering what would be the action if the stripping-guards were fixed eccentrically to the shaft which drives the teeth, alongside the teeth. In such case it is apparent that the teeth protruding beyond the guards toward the platform would be gradually covered by the guards as they rose through the slots in the receiving-platform and passed stubbleward, and would be completely covered at some point when or before they passed down below the platform. The danger in using the guards stationary to strip the grain from the carrying-teeth is that the straw lying in the angle between the protruding tooth and the adjacent periphery of the stripping-guard, and being pushed by the tooth over the stationary guard, would be liable to be broken and drawn in with the tooth as it withdrew beneath the platform or behind the guard. This is prevented by causing the guards, instead of being fixed, to revolve at such speed that the periphery on which the grain rests shall travel as fast or faster than the tooth which stands alongside the guard and is pushing the grain, for the travel of the guard on which the grain is resting will then draw the grain out as fast or faster than the tooth can push it in. The structure above described accomplishes this result, as will be best understood from inspection of the diagram, Fig. 10, noticing, first, that the action is that the spurs or grain-carrying teeth K⁹ engage the studs or rivets K¹³, and thereby drive the annular stripping-disks in the same direction as the shaft K⁵ is revolved.

The result above stated will be mathematically perfect when the proportions of the several parts are such that the parts $xy$ and $yz$ of the chord $xz$ of the circle which is the path of the studs bear the same ratio as the diameters of said circle and the circle which bounds the stripping-disks, the said chord being inclined forty-five degrees to the line which connects the centers of the shaft K⁵ and that of the annulus, and passing through the former center. In practice, however, it is not necessary to be confined to these proportions, for the general arrangement of parts above described, without regard to any definite proportions, will cause the stripping-disks to travel always in the same direction as the tooth, and during the greater part of the course when it is carrying the grain to travel faster than the tooth adjacent to its stripping-edge.

It will be seen that the carrying-teeth K⁹ are substantially radial, their grain-actuating face being strictly so, and hence that they will actuate the grain by a direct and positive push toward the receiving-platform, differing in this respect from similarly-located devices, wherein, to insure ease in stripping, the teeth are curved backward, and so gain only a frictional grasp upon the grain, and in some conditions, and generally when the grain is accumulated heavily above them, will slip under the grain without carrying it. For this reason I find a positively-actuating device essential when the space for accumulating the grain between the conveying-platform and the packers is made so small that the grain must necessarily become heavily accumulated over the clearing-rake during the interval of binding.

The packers Q' Q² are of familiar construction. The teeth $q'$ of the forward packer are made longer than the teeth $q^2$ of the rear packer, and thereby tend to advance the butts of the grain faster and farther than the heads are advanced by the shorter teeth of the rear packer. I also find it of advantage to so locate and time the action of the packers that the teeth of the forward one shall stand a little in advance in the path of its revolution of the corresponding teeth of the rear packer, so that the grain will be seized by the forward packer a little sooner than by the rear. There being no mechanism acting upon the grain above the rear packer, the action of the forward packer, entering and slightly dividing the grain before the rear packer enters it, tends to make a slight rift in the grain, into which the rear packer enters, so tending to cause the two corresponding teeth to grasp the same grain; but the principal purpose and effect of this arrangement of the teeth is to turn the grain by carrying the butts a little farther forward than the heads. This is of course in addition to the turning which is effected by the mere fact that the packers act in parallel planes oblique to the flow of grain from the platform.

I claim—

1. In combination with the slotted deck, the grain-rake comprising a revolving shaft under the deck having parallel sets of radial teeth and stripping-disks mounted on bearings eccentric to and independent of the shaft and revolved laterally adjacent to the several parallel sets of teeth, respectively, and protruding through the slots of the deck.

2. In combination with a slotted deck, a grain-rake comprising a revolving shaft under the deck having several parallel sets of radial teeth, and stripping-disks mounted on bearings eccentric to and independent of the shaft and provided with laterally-projecting studs, whereby the teeth engage and drive the disks eccentrically to the shaft in the same direction.

3. In combination with the slotted deck, the rake comprising the revolving shaft under the deck, and having the parallel sets of equally-spaced radial teeth, the fixed eccentric blocks pierced by the shaft, the stripping-disks revolved upon the eccentric blocks and protruding through the slots of the deck and having lateral studs, whereby they are engaged and driven by the teeth.

4. In a grain-harvester, a revolving grain-rake comprising a revolving shaft having parallel sets of equispaced radial-teeth, and stripping-disks arranged in pairs, each pair embracing one set of equispaced teeth, said stripping-disks mounted in rigid bearings eccentric to the rake-shaft and provided with studs connecting the two disks of each pair in the angles between the consecutive teeth of the set.

5. In a grain-harvester, in combination with the conveying-platform and the receiving-platform wider at the front than at the rear, a revolving toothed rake having its shaft below the level of the receiving-platform, eccentric stripping-disks revolved in the same direction as the rake adjacent to its teeth, and an overhanging toothed rake having its front teeth longer than its rear teeth.

6. In a grain-harvester, the combination, with the cutter-bar platform, mechanism for delivering the grain sidewise therefrom, and the binder-platform, of a guard pivoted forward of said platforms, overhanging the delivery end of the cutter-bar platform and oscillating vertically, and having grain-retaining fingers extending downward and stubbleward therefrom toward the binder-platform.

7. In a grain-harvester, the combination, with the cutter-bar platform, mechanism for delivering the grain sidewise therefrom, a binder-platform, and packing mechanism operating obliquely above the same, of the floating guard comprising the vertically-oscillating frame overhanging the delivery end of the cutter-bar platform and provided with the retaining-fingers extended downward and stubbleward therefrom toward the binder-platform, the fingers toward the front being longer than those toward the rear.

8. In a harvesting-machine, in combination with the conveying-platform, a receiving-platform at the delivery end thereof and slotted at its adjacent end, a clearing-rake operating from below the receiving-platform and moving its teeth upward and stubbleward through the slots, and a guard pivoted forward of said platforms, overhanging the delivery end of the cutter-bar platform and oscillating vertically, and having grain-retaining fingers extending downward and stubbleward therefrom toward the binder-platform.

9. In a harvesting-machine, in combination with the conveying-platform, a slotted receiving-platform at the delivery end thereof, a revolving clearing-rake provided with eccentric stripping-disks revolved in the same direction as the rake, operating from below the receiving-platform and revolving its teeth up through the slots thereof, and a floating guard comprising a vertically-oscillating frame overhanging the delivery end of the conveying-platform, and retaining-fingers extended downward and stubbleward therefrom, the forward of said fingers being longer than the rear.

10. In a grain-harvester, in combination, the conveying-platform, the receiving-platform adjacent thereto, the floating guard comprising the vertically-oscillating frame overhanging the delivery end of the conveying-platform, and the retaining-fingers extended downward and stubbleward therefrom, and an overhanging clearing-rake having its grain-actuating teeth moving from above the delivery end of the conveying-platform stubbleward above the receiving end of the receiving-platform between the retaining-fingers of the floating guard.

11. In a grain-harvester, in combination, the conveying-platform, the receiving-platform at the delivery end thereof, an overhanging floating frame having its grain-retaining fingers extended downward and stubbleward over the receiving-platform, and a clearing-rake having its rear end journaled in and oscillating vertically with such floating frame and having its front teeth longer than its rear teeth, and means for actuating it to cause its grain-actuating teeth to move between the retaining-fingers from above the delivery end of the conveying-platform stubbleward over the receiving-platform.

12. In a grain-harvester, in combination, the conveying-platform, the slotted receiving-platform at the delivery end thereof, an under clearing-rake operating from below the receiving end of the receiving-platform and moving its teeth upward through the slots thereof, an overhanging floating frame having grain-retaining fingers extended downward and stubbleward therefrom over the receiving-platform, a clearing-rake having its rear end journaled in the floating frame and oscillating vertically therewith, and means for actuating it to cause its grain-actuating teeth to move from above the delivery end of the conveying-platform over the receiving end of the receiving-platform.

13. In a grain-harvester, in combination, the conveying-platform, a slotted receiving-platform at the delivery end thereof, an under clearing-rake operated from below the receiving end of the receiving-platform and moving its teeth upward and stubbleward through the slots thereof, an overhanging floating frame having grain-retaining fingers extended downward and stubbleward therefrom over the receiving-platform, a clearing-rake having its rear end journaled in and oscillating vertically with the floating frame and having its front teeth longer than its rear teeth, and means for actuating such rake to cause its teeth to move from above the delivery end of the conveying-platform stubbleward over the receiving end of the receiving-platform.

14. In a grain-harvester, in combination, the cutter-bar platform, mechanism for delivering the grain sidewise therefrom, a floating guard overhanging the delivery end of the cutter-bar platform, and retaining-fingers extended downward and stubbleward therefrom, the front fingers being longer than the rear fingers, and mechanism for advancing the butts of the grain while still restrained under the said retaining-fingers.

15. In a grain-harvester, in combination, the cutter-bar platform, mechanism for delivering the grain sidewise therefrom, a floating guard overhanging the delivery end of the cutter-bar platform, having retaining-fingers extended downward and stubbleward therefrom, and a butting device having its grain-actuating face moving in a plane crosswise of the length of the grain in front of the butts and extending grainward beyond the stubbleward limit of the movement of the mechanism which delivers the grain from the cutter-bar platform.

16. In a grain-harvester, in combination, the cutter-bar platform and the binder-platform and mechanism for moving the grain positively from the former toward the latter, a floating guard overhanging the delivery end of the cutter-bar platform and having grain-retaining fingers extended downward and stubbleward therefrom, and a butting device having its grain-actuating face moving in a plane crosswise of the length of the grain and in front of the butts and extending grainward beyond the limit of movement of the mechanism which delivers the grain off the cutter-bar platform.

17. In a grain-harvester, in combination, the conveying-platform, the receiving-platform at the delivery end thereof, the overhanging vertically-oscillating guard having the grain-retaining fingers extending from above the delivery end of the conveying-platform over the receiving end of the receiving-platform, an overhanging clearing-rake having its teeth operating between the fingers, and a butting-belt carried on vertical rollers, its grain-actuating ply moving from a point in front of the platform-conveyer obliquely rearward across the front end of the receiving-platform.

18. In a grain-harvester, in combination, the conveying-platform, the receiving-platform at the delivery end thereof, a floating frame overhanging the delivery end of the conveying-platform and having the retaining-fingers extended downward and stubbleward therefrom over the receiving-platform, a clearing-rake having its rear end journaled in said floating frame and oscillating vertically therewith and having its front teeth longer than its rear teeth, and a butting device having its grain-actuating face moving in a vertical plane extending obliquely back from the heel of the sickle across the receiving-platform.

19. In a grain-harvester, in combination, the conveying-platform, the slotted receiving-platform adjacent to the delivery end thereof, the under clearing-roller having its teeth moving upward and stubbleward through the slots, the overhanging floating frame, and the upper clearing-rake having its rear end journaled in the rear end of said frame and oscillating vertically therewith, and the endless butting-belt with its grain-actuating ply traveling obliquely back across the front end of the receiving-platform.

20. In a grain-harvester, in combination, the conveying-platform, the receiving-platform adjacent thereto, the under clearing-rake having its teeth moving upward and stubbleward through its slots, the overhanging floating frame, and the upper clearing-rake journaled in the rear end thereof and oscillating vertically therewith and having its front teeth longer than its rear teeth, and a butting device having its grain-actuating face moving in vertical plane extending obliquely back across the front end of the receiving-platform.

21. In combination, substantially as set forth, the cutter-bar platform and mechanism for delivering the grain sidewise therefrom, and a revolving packer having two sets of teeth whose planes of rotation are oblique to the direction of motion of the platform-conveyer, each set having the same number of teeth, the teeth of the forward set being located in their path of rotation in advance of the corresponding teeth of the rear set.

22. In combination, substantially as set forth, the cutter-bar platform and means for moving the grain sidewise therefrom toward the packer, the packer comprising two sets of teeth revolving in vertical planes oblique to the motion of the platform-conveyer and having each the same number of teeth, the teeth of the forward set being longer than those of the rear.

23. In combination, substantially as set forth, the cutter-bar platform and mechanism which delivers the grain sidewise therefrom, the packer comprising two sets of teeth revolving in planes oblique to the direction of the motion of the conveyer and having each the same number of teeth, those of the forward set being longer than those of the rear set and located in their path of rotation in advance of the corresponding teeth of the rear set.

24. In a grain-harvester, in combination with a main frame formed substantially as described, whereby its inner side constitutes a lower inside divider, the grain-guard sustained above said part of the main frame and extending back across the cutter-bar platform, substantially as and for the purpose set forth.

25. In a self-binding harvester, in combination, the main frame, the binder-frame sustained thereon and located obliquely to the line of draft and adapted to be moved back and forward on the main frame in a direction parallel with the line of draft, the binder-driving shaft journaled at one end on the binder-frame in bearings parallel with the said oblique direction of said frame and having its other end sliding through its actuating-wheel journaled on the main frame in bearings parallel with the line of draft, and provided with a universal joint between said bearings, substantially as set forth.

26. In a self-binding harvester, in combination, the main frame, the binder-frame sustained thereon and located obliquely to the line of draft, and the binder-driving shaft journaled at one end on the binder-frame in bearings parallel with its said oblique direction, and at the other end in the main frame in bearings parallel with the line of draft, and provided with a universal joint between its said bearings, substantially as set forth.

27. In a self-binding harvester, in combination with the main frame, a binder-frame which is supported on the main frame, has its shaft-bearing arms which overhang and underlie the binder-table, and the binder-actuating shafts journaled in said arms oblique to the line of draft, and which is adapted to be moved back and forward over the main frame in a direction parallel with the line of draft, a wheel sustained upon the main frame and revolved about a horizontal axis, and a shaft whose axis coincides with that of the wheel and revolved thereby and adjustable in the direction of its axis, and mechanism for communicating motion from such shaft to the oblique shafts journaled on the binder-frame.

28. In a self-binding grain-harvester, in combination with a binder whose shaft-bearing arms and the shafts journaled therein, which drive the packing and binding mechanism, are oblique to the line of draft of the machine, and which is adapted to be moved over the main frame in a direction parallel with the line of draft, a horizontal shaft parallel with the line of draft, sustained on the main frame and revolved by the main driving-train, and adapted to slide endwise in its bearings on the main frame, and mechanism by which said shaft communicates motion to the oblique shafts on the binder-frame.

29. In a self-binding grain-harvester, in combination with the main frame, a binder which has its shaft-bearing arms which overhang and underlie the binder-table oblique to the line of draft, horizontal ways on the main frame parallel with the line of draft, suitable supports for the binder-frame adapted to rest and move upon said ways, and means for moving the binder-frame back and forward over said ways in a direction parallel with the line of draft.

30. In a self-binding harvester, in combination with receiving and binding platforms constructed substantially as described, whereby they comprise a substantially horizontal portion at the delivery end of the conveying-platform, wider at the front than at the rear, and an upward-sloping portion of substantially uniform width in front of the needle-rift, and packing mechanism operating above the platform in an oblique direction to gather the grain upon and advance it over the upward-sloping portion of the platform, substantially as set forth.

31. In a self-binding grain-harvester, in combination, the receiving and binding platforms constructed substantially as described, whereby they comprise a substantially horizontal portion at the delivery end of the conveying-platform, wider at the front than at the rear, and an upward-sloping portion lying oblique to the horizontal portion and of substantially uniform width in front of the needle-rift, butt-forwarding mechanism operating across the wider end of the horizontal portion, and packing mechanism operating in an oblique direction over the narrower end of the horizontal portion and over the upward-sloping portion, whereby the grain is gathered upon said upward-sloping portion in a position parallel with its said oblique direction and advanced upward over it in the direction of the motion of the said packing mechanism.

32. In a self-binding grain-harvester, in combination with the main frame, the receiving-platform, and the binder-frame adapted to slide back and forward over the main frame in a direction parallel with the line of draft, the binder-platform sloping upward and obliquely backward from the receiving-platform and moving backward and forward with the binder-frame.

33. In a self-binding harvester, in combination with the main frame and the binder-frame adapted to move back and forward thereon in a direction parallel with the line of draft, a horizontal receiving-platform, and a binder-platform sloping upward and obliquely backward therefrom and of substantially uniform width in front of the needle-rift, and narrowing rearward from the needle-rift, and moving backward and forward with the binder-frame.

In testimony whereof I have hereunto set my hand, in the presence of two witnesses, at Chicago, Illinois, this 29th day of August, 1884.

ANDREW STARK.

Attest:
CHAS. S. BURTON,
FRANCIS W. PARKER.